126,148

UNITED STATES PATENT OFFICE.

AZEL STORRS LYMAN, OF NEW YORK, N. Y.

IMPROVEMENT IN PRESERVING MEATS AND VEGETABLES.

Specification forming part of Letters Patent No. 126,148, dated April 30, 1872.

I, AZEL S. LYMAN, of the city, county, and State of New York, have invented a certain Process for Concentrating Meat, Fruit, or Vegetables, of which the following is a specification:

Warm the meat, fruit, or vegetable that is to be concentrated, by placing it in a current of dry warm air, then introduce it into a vacuum-chamber, and make a vacuum so perfect that water shall be rapidly evaporated from it. I prefer for this purpose such a vacuum apparatus as is described in my specification for a patent granted June 22, 1869. The vacuum suddenly formed, not only causes the evaporation of some of the water from the surface, but the sudden expansion of another portion in the interior into steam, drives out more before it on to the surface, from which it is readily evaporated by the air. As soon as removed from the vacuum-chamber introduce it again into the oven, and thus alternately warm it in the air and cool it by rapid evaporation till it is sufficiently dried. I have dried sweet-corn, blackberries, apples, peaches, potatoes, and various other vegetables by this process in four to eight hours, without warming them above 120° Fahrenheit. Large stalks of rhubarb shrunk to a mere ribbon, and their condensed acid was exceedingly strong.

Beef dried by this mode is a very different article from ordinary dried beef. It is lighter colored, and its pores are so opened that it absorbs water very much more readily. After having been kept through one summer with no protection but paper, while stored in a garret, it was prepared for use as follows: When to be used for breakfast the steak was laid on a deep plate the night before, and about as much pure water poured over it as it originally contained, then it was bent back and forth a few times to make it take up some of the water, and finally left in the water with another plate turned over it to protect it. The next morning it was generally found to have absorbed about all the water, and to have swollen to nearly its original bulk, and when broiled it could not easily be distinguished from fresh beef that had been hanging two or three weeks in cold dry air. Sometimes I only partially dry the meat by this process, and then seal it up from the air.

I claim as my invention—

1. The process of concentrating meat, fruit, or vegetables by alternately warming in the air, and cooling by rapid evaporation in a nearly perfect vacuum, in the manner substantially and for the purposes specified.

2. As a new manufacture, meat that has been concentrated by alternately warming in the air, and cooling it by rapid evaporation in a nearly perfect vacuum, substantially as and for the purposes specified.

AZEL STORRS LYMAN.

Witnesses:
WM. H. RIBLET,
M. J. ENNIS.